(12) United States Patent
Kitanaka

(10) Patent No.: US 8,615,341 B2
(45) Date of Patent: Dec. 24, 2013

(54) PROPULSION CONTROL APPARATUS FOR ELECTRIC VEHICLE

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 159 days.

(21) Appl. No.: 13/062,808

(22) PCT Filed: Oct. 23, 2008

(86) PCT No.: PCT/JP2008/069232
§ 371 (c)(1),
(2), (4) Date: Mar. 8, 2011

(87) PCT Pub. No.: WO2010/046984
PCT Pub. Date: Apr. 29, 2010

(65) Prior Publication Data
US 2011/0166736 A1    Jul. 7, 2011

(51) Int. Cl.
*B60L 15/20*    (2006.01)

(52) U.S. Cl.
USPC ............................................. 701/22

(58) Field of Classification Search
USPC ............................................. 701/22
See application file for complete search history.

(56) References Cited

U.S. PATENT DOCUMENTS

| | | | |
|---|---|---|---|
| 4,825,131 A | | 4/1989 | Nozaki et al. |
| 5,399,909 A | * | 3/1995 | Young ............................. 307/65 |
| 5,491,622 A | * | 2/1996 | Carosa ........................ 363/56.02 |
| 6,122,181 A | * | 9/2000 | Oughton, Jr. ................... 363/37 |
| 6,615,118 B2 | * | 9/2003 | Kumar ............................. 701/19 |
| 6,806,671 B2 | * | 10/2004 | Kusaka et al. ................ 318/442 |
| 6,900,555 B2 | * | 5/2005 | Sakamoto et al. ........... 307/10.1 |

(Continued)

FOREIGN PATENT DOCUMENTS

| | | |
|---|---|---|
| DE | 37 37 633 A1 | 5/1988 |
| EP | 1 724 147 A2 | 11/2006 |

(Continued)

OTHER PUBLICATIONS

International Search Report (PCT/ISA/210) issued on Jan. 20, 2009, by Japanese Patent Office as the International Searching Authority for International Application No. PCT/JP2008/069232.

(Continued)

*Primary Examiner* — Thomas Tarcza
*Assistant Examiner* — Alex C Dunn
(74) *Attorney, Agent, or Firm* — Buchanan Ingersoll & Rooney PC

(57) ABSTRACT

A propulsion control apparatus for an electric vehicle includes an inverter that converts a direct-current voltage into an alternating-current voltage, a power storage element, and a DCDC converter connected to the power storage element. The control apparatus further includes a circuit selector unit that selects any one of power supplied from an external power supply via a power collecting device and power supplied from the power storage element and outputs it to the inverter. A linkage control unit controls at least the DCDC converter and the circuit selector unit in a linked manner, in which the linkage control unit inputs control signals at least to the DCDC converter and the circuit selector unit and controls them in a linked manner, in accordance with each of a case where the electric vehicle travels by receiving power from the external power supply and a case where the electric vehicle travels by power from the power storage element.

26 Claims, 5 Drawing Sheets

(56) References Cited

U.S. PATENT DOCUMENTS

| | | | |
|---|---|---|---|
| 7,102,305 B2* | 9/2006 | Suzuki | 318/400.02 |
| 7,161,323 B2* | 1/2007 | Ajima et al. | 318/629 |
| 7,586,768 B2* | 9/2009 | Yoshimoto | 363/71 |
| 7,835,831 B2* | 11/2010 | Chung et al. | 701/22 |
| 8,050,810 B2* | 11/2011 | Egoshi | 701/22 |
| 8,112,191 B2* | 2/2012 | Kumar et al. | 701/22 |
| 8,180,544 B2* | 5/2012 | Noffsinger et al. | 701/70 |
| 2002/0024307 A1* | 2/2002 | Bader | 318/106 |
| 2002/0174796 A1 | 11/2002 | Kumar et al. | |
| 2006/0005736 A1* | 1/2006 | Kumar | 105/1.4 |
| 2007/0194746 A1* | 8/2007 | Yoshimoto | 318/801 |
| 2008/0272706 A1* | 11/2008 | Kwon et al. | 315/219 |
| 2008/0288192 A1* | 11/2008 | Kumar et al. | 702/60 |
| 2009/0267412 A1* | 10/2009 | Kitanaka | 307/10.7 |

FOREIGN PATENT DOCUMENTS

| | | |
|---|---|---|
| JP | 2-070201 A | 3/1990 |
| JP | 2002-191102 A | 5/2002 |
| JP | 2006-014395 A | 1/2006 |
| RU | 2013230 C1 | 5/1994 |
| WO | WO 2008/018131 A1 | 2/2008 |

OTHER PUBLICATIONS

Written Opinion (PCT/ISA/237) issued on Jan. 20, 2009, by Japanese Patent Office as the International Searching Authority for International Application No. PCT/JP2008/069232.

Russian Decision on Grant dated Oct. 23, 2012, issued in corresponding Russian Patent Application No. 2011120333/11(030143). (20 pages).

Office Action from Chinese Patent Office dated Feb. 16, 2013, issued in corresponding Chinese Patent Application No. 200880131823.0, with English translation thereof.

Office Action from Canadian Intellectual Property Office dated Apr. 15, 2013, issued in corresponding Canadian Patent Application No. 2,740,979. (3 pages).

* cited by examiner

PROPULSION CONTROL APPARATUS FOR ELECTRIC VEHICLE

TECHNICAL FIELD

The present invention relates to an electric vehicle control apparatus, particularly to a propulsion control apparatus for an electric vehicle that causes the electric vehicle to travel by power supplied from a power storage element when power cannot be received from an overhead line due a power interruption of the overhead line or a failure of a power collecting device.

BACKGROUND ART

Generally, an electric vehicle collects power from an overhead line via a power collecting device and travels by driving an electric motor by the power. In recent years, with improvement of a performance of a power storage element such as a secondary battery and an electric double layer capacitor, a development of a system in which these are mounted on the electric vehicle and the electric vehicle travels by driving the electric motor by power from the power storage element has been progressed.

Conventionally, for example, in an electric vehicle control apparatus disclosed in Patent Document 1 described below, when power can be received from an overhead line (hereinafter, "in a normal condition"), an electric motor is driven by power from the overhead line similarly to a conventional electric railroad. On the other hand, when power cannot be received from the overhead line due to a power interruption of the overhead line or a failure of a power collecting device (hereinafter, "in an emergency condition"), it is configured such that the electric vehicle can travel to a nearest station by driving the electric motor by power from a power storage element so that the electric vehicle does not get stuck on a track between stations.

A traveling example by this electric vehicle control apparatus is as follows. In the normal condition, a pantograph that is the power collecting device is raised, power is collected from the overhead line, and the electric motor is driven to cause the electric vehicle to travel as an existing electric railroad. In the emergency condition, the pantograph is lowered, and the electric vehicle travels by power from the power storage element. When power can be received from the overhead line, power from the overhead line is charged to this power storage element by charge control, so that power of a predetermined capacity is maintained.

Patent Document 1: Japanese Patent Application Laid-open No. 2006-014395

DISCLOSURE OF INVENTION

Problem to be Solved by the Invention

However, in the current technology level, both of an energy density and a power density of a power storage element are small. Thus, it is difficult to mount a power storage element, which is capable of exerting a performance equal to that of the case of receiving power from the overhead line, on the electric vehicle due to restriction on a mounting space, weight, and the like. Therefore, in the electric vehicle control device disclosed in the above-mentioned Patent Document 1, when the electric vehicle is caused to travel by power from the power storage element, supply power to the electric motor is limited (insufficient) compared to the case of travelling by receiving power from the overhead line. Thus, the performance, which the electric motor can exert, decreases and thus the vehicle speed decreases. Such a case is limited to the emergency condition, so that decrease in the vehicle speed itself is acceptable; however, problems to be described below mainly occur.

As a first problem, when the vehicle speed decreases, an inverter mounted on the electric vehicle control device is operated continuously in a region in which a switching loss is large, so that the inverter is overheated. To explain this in detail, generally, the inverter of the electric vehicle is driven in a multi-pulse PWM mode in which a switching frequency is around 1000 Hz from the start to the vehicle speed of around ¼ of a maximum speed. Next, when the output frequency of the inverter becomes high, in order to avoid that the number of pulses included in a half cycle of the output voltage of the inverter decreases and a waveform distortion increases, the mode is switched to a synchronous pulse mode. At this time, the number of pulses included in the half cycle of the inverter output voltage is about 9, 5, and 3. These numbers of pulses are selected depending on the speed. After the vehicle speed reaches about ⅓ of the maximum speed, in order to maximize the output voltage of the inverter, the inverter is driven in a one-pulse mode. At this time, the number of pulses included in the half cycle of the inverter output voltage is one, which is a minimum, so that the switching loss can be minimized and a cooling fin of the inverter can be made small.

To explain with a specific vehicle speed, in a typical commuter train, the maximum speed is about 120 km/h, so that the commuter train is in the multi-pulse PWM mode from the start until the vehicle speed reaches to 30 km/h (¼ of the maximum speed). Thereafter, the mode is switched to the synchronous pulse mode, and then is switched to the one-pulse mode at around 40 km/h (about ⅓ of the maximum speed).

However, when travelling by power from the power storage element, as described above, supply power to the electric motor is limited, so that the maximum speed is about 30 km/h. Therefore, the inverter is always switched in the multi-pulse PWM mode of around 1000 Hz and thus is operated continuously in the state where the switching loss is large. Thus, with the cooling fin of the inverter, which is designed considering an operation in the one-pulse mode, the cooling performance is insufficient.

As a countermeasure for the above problems, it is possible to specially design an inverter with enhanced cooling performance considering an operation at a low speed; however, it causes increase in weight, dimension, cost, and the like of the inverter device.

As a second problem, in order to cause the electric vehicle to travel, power needs to be supplied to loads such as a compressor that generates compressed air for driving a brake, a protection device, and a control device. In the normal condition, an auxiliary power device converts the power supplied from the overhead line into a low voltage power of around AC 400 V and around DC 100 V and supplies it to each load.

On the other hand, in the emergency condition, the auxiliary power device becomes unable to function, so that power cannot be supplied to each load. Particularly, the compressor stops operating, whereby the compressed air for brake cannot be ensured and the electric vehicle cannot travel.

For enabling the electric vehicle to travel, a configuration of causing the auxiliary power device to operate by power from the power storage element and supplying power to each load is considered; however, when the input voltage of the auxiliary power device falls outside the range of the voltage that is received from the overhead line in the normal condition, there is a problem that the auxiliary power device cannot maintain a specified output voltage and stops. Therefore, the auxiliary power device that is specially designed for accommodating both of the receiving voltage from the overhead line and the voltage from the power storage element is needed, which causes increase in weight, dimension, and cost.

The present invention has been made in view of the above, and an object thereof is to obtain a propulsion control apparatus for an electric vehicle capable of suitably causing the electric vehicle to travel by utilizing power from a power storage element in an emergency condition such as a power interruption of an overhead line while avoiding increase in weigh, dimension, and cost of an inverter that drives an electric motor and an auxiliary power device that performs power supply to a load.

Means for Solving Problem

To solve the problem described above and achieve the object, a propulsion control apparatus for an electric vehicle that includes an inverter that converts a direct-current voltage into an alternating-current voltage, a power storage element, and a DCDC converter connected to the power storage element, includes: a circuit selector unit that selects any one of power supplied from an external power supply via a power collecting device and power supplied from the power storage element and outputs it to the inverter; and a linkage control unit that controls at least the DCDC converter and the circuit selector unit in a linked manner, wherein the linkage control unit inputs a control signal at least to each of the DCDC converter and the circuit selector unit and controls them in a linked manner, in accordance with each of a case where the electric vehicle travels by receiving power from the external power supply and a case where the electric vehicle travels by power from the power storage element.

Effect of the Invention

In the propulsion control apparatus for the electric vehicle according to the present invention, the configuration is such that the circuit selector unit that selects one of the power supplied from the external power supply and the power supplied from the power storage element and supplies the power to the inverter, and the linkage control unit that controls the DCDC converter and the circuit selector unit in a linked manner are included, and the DCDC converter and the circuit selector unit are controlled in a linked manner, so that a travel control of the electric vehicle utilizing the power from the power storage element can be suitably performed in the emergency condition such as a power interruption of the overhead line while avoiding increase in weigh, dimension, and cost of the inverter and the auxiliary power device.

EXPLANATIONS OF LETTERS OR NUMERALS

Figure 1:
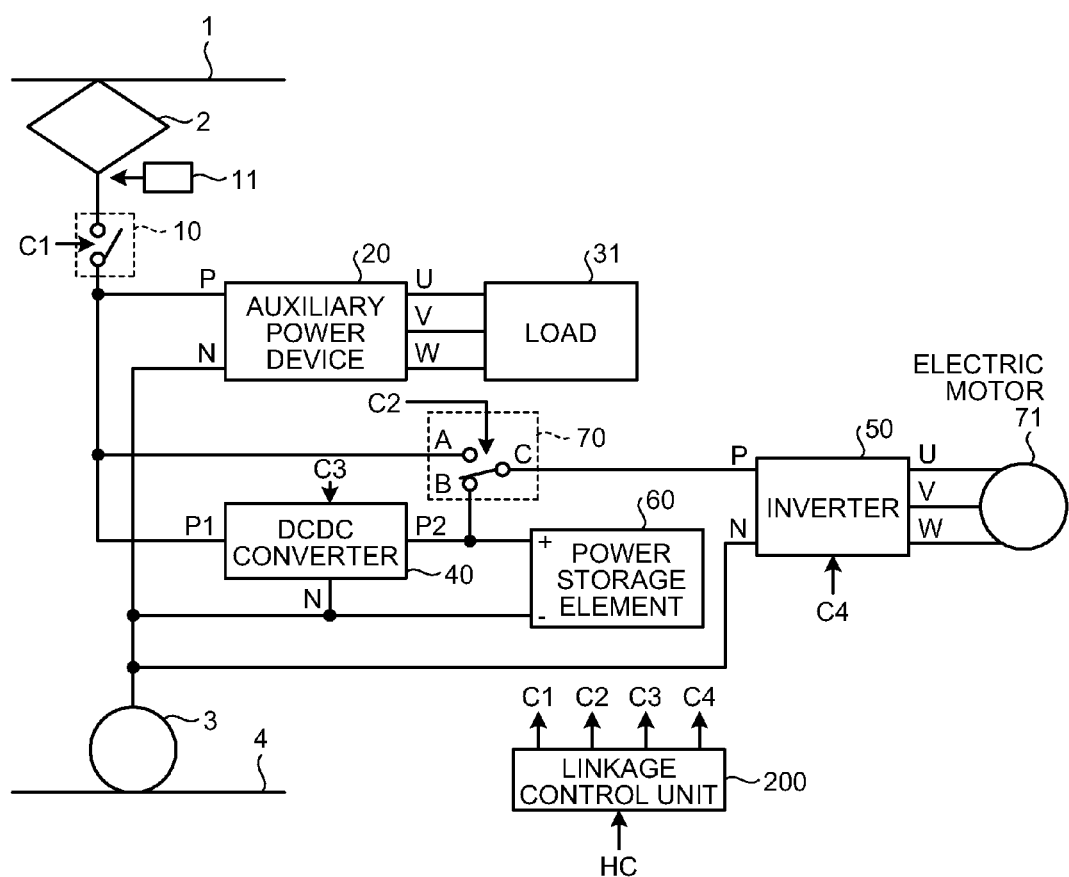
FIG. 1 is a diagram illustrating a configuration example of a propulsion control apparatus for an electric vehicle according to a present embodiment.

1 Overhead line
2 Power collecting device
3 Wheel
4 Rail
10 Open/close switch (open/close unit)
11 Power-collecting-state detecting unit
20 Auxiliary power device
21, 41, 45, 51 Reactor
22, 42, 52 Filter capacitor
23, 53 Inverter circuit
23a, 23b, 23c, 23d, 23e, 23f, 43a, 43b, 53a, 53b, 53c, 53d, 53e, 53f Semiconductor switching element
29 AC filter
30 Transformer
31 Load
40 DCDC converter
43 Switching circuit
54 Voltage detecting unit
59a Input-voltage monitoring unit
47 Current detector
48 DCDC converter control unit
50 Inverter
59 Inverter control unit
59b Protection operation unit
60 Power storage element
70 Circuit selector switch (circuit selector unit)
71 Electric motor
200 Linkage control unit
C1, C2, C3, C4, HC Control signal

BEST MODE(S) FOR CARRYING OUT THE INVENTION

An exemplary embodiment of a propulsion control apparatus for an electric vehicle according to the present invention will be explained in detail below based on the drawings. The invention is not limited to this embodiment.

Embodiment

FIG. 1 is a diagram illustrating a configuration example of a propulsion control apparatus for an electric vehicle according to the present embodiment. The propulsion control apparatus for the electric vehicle shown in FIG. 1 is configured to include as main components an auxiliary power device 20, a load 31, a DCDC converter 40, a circuit selector switch 70 that is a circuit selector unit, a power storage element 60, an inverter 50, and an electric motor 71. Moreover, a power-collecting-state detecting unit 11 that detects a connection state of an overhead line 1 and a power collecting device 2 or a state of the power collecting device 2, and an open/close switch 10 that is an open/close unit that separates the overhead line 1 from the power system of the propulsion control apparatus for the electric vehicle are included.

As shown in FIG. 1, the propulsion control apparatus for the electric vehicle receives power from the overhead line 1 that is an external power supply connected to a substation (not shown) via the power collecting device 2. The power supplied from the overhead line 1 is supplied to each of the auxiliary power device 20, the DCDC converter 40, and the circuit selector switch 70 via the open/close switch 10. FIG. 1 illustrates an overhead wire as the overhead line 1 and a pantographic one as the power collecting device 2; however, they are not limited thereto, and for example, a third rail and a power collecting device for a third rail used in a subway or the like can be used.

The auxiliary power device 20 is a device that converts power (typically, about DC 600 V to 3000 V that is a voltage of the overhead line 1) received between input terminals P-N from the power collecting device 2 or from the DCDC converter 40 into a low voltage power (typically, about AC 400 V or DC 100 V) and outputs it, and the output thereof is connected to the load 31. FIG. 1 illustrates only the form of outputting a three-phase AC, in which output terminals of the auxiliary power device 20 are U-V-W; however, a plurality of output systems including a DC output is typically present, thus enabling to accommodate various forms of power.

The load 31 is a compressor that generates an air source for a brake of the electric vehicle, a protection device, a control device, an air conditioning, an in-vehicle illumination, and the like, and operates by a low voltage power output from the auxiliary power device 20. The sum of these loads is, for example, about 400 kW in an example of a 10-car commuter train. Among them, the sum of important loads necessary for travel of the electric vehicle, such as a compressor that generates an air source for a brake, a protection device, a control device, and the like, is about 50 kW.

A linkage control unit 200 is configured such that a control signal HC is input from outside, and control signals C1, C2, C3, and C4 are output therefrom to the open/close switch 10, the circuit selector switch 70, the DCDC converter 40, and the inverter 50 to control these devices in a linked manner. For the linkage control unit 200, the configuration is illustrated in which the output control signals C1, C2, C3, and C4 are output to one open/close switch 10, one circuit selector switch 70, one DCDC converter 40, one the inverter 50, respectively; however, when the number of each of these devices is more than one, the configuration can be such that each of the control signal C1, C2, C3, and C4 is output to the corresponding devices the number of which is more than two. The control signal HC is a signal that is generated, for example, by a button operation by a driver of the electric vehicle or an external part such as an operation command center that is located outside the electric vehicle and instructs and manages an operation of a train, and is a signal generated when the electric vehicle cannot travel by the power from the overhead line 1 in the case of a power interruption of the overhead line 1 or a failure of the power collecting device 2. The control signal C1 is a signal that causes the open/close switch 10 to open and close, and the control signal C2 is a signal that performs a switching control of the circuit selector switch 70. Moreover, the control signal C3 is a signal that includes a control mode switching and operation and stop commands of a DCDC converter control unit 48 to be described later. Furthermore, the control signal C4 is a signal that performs a setting change of a protection setting value related to an input voltage of an inverter control unit 59 to be described later. The control signal C4 is not essential, which is described later.

The linkage control unit 200 can be provided inside the propulsion control apparatus for the electric vehicle, such as the inverter 50 and the DCDC converter 40, or can be provided outside the propulsion control apparatus for the electric vehicle. Moreover, the linkage control unit 200 can be such that all the functions are mounted on one device or the functions are divided into a plurality of groups to be mounted on each of a plurality of devices such as the inverter 50 and the DCDC converter 40. In other words, there is no restriction on a physical arrangement so long as the open/close switch 10, the circuit selector switch 70, the DCDC converter 40, and the inverter 50 can be controlled in a linked manner.

Figure 2:
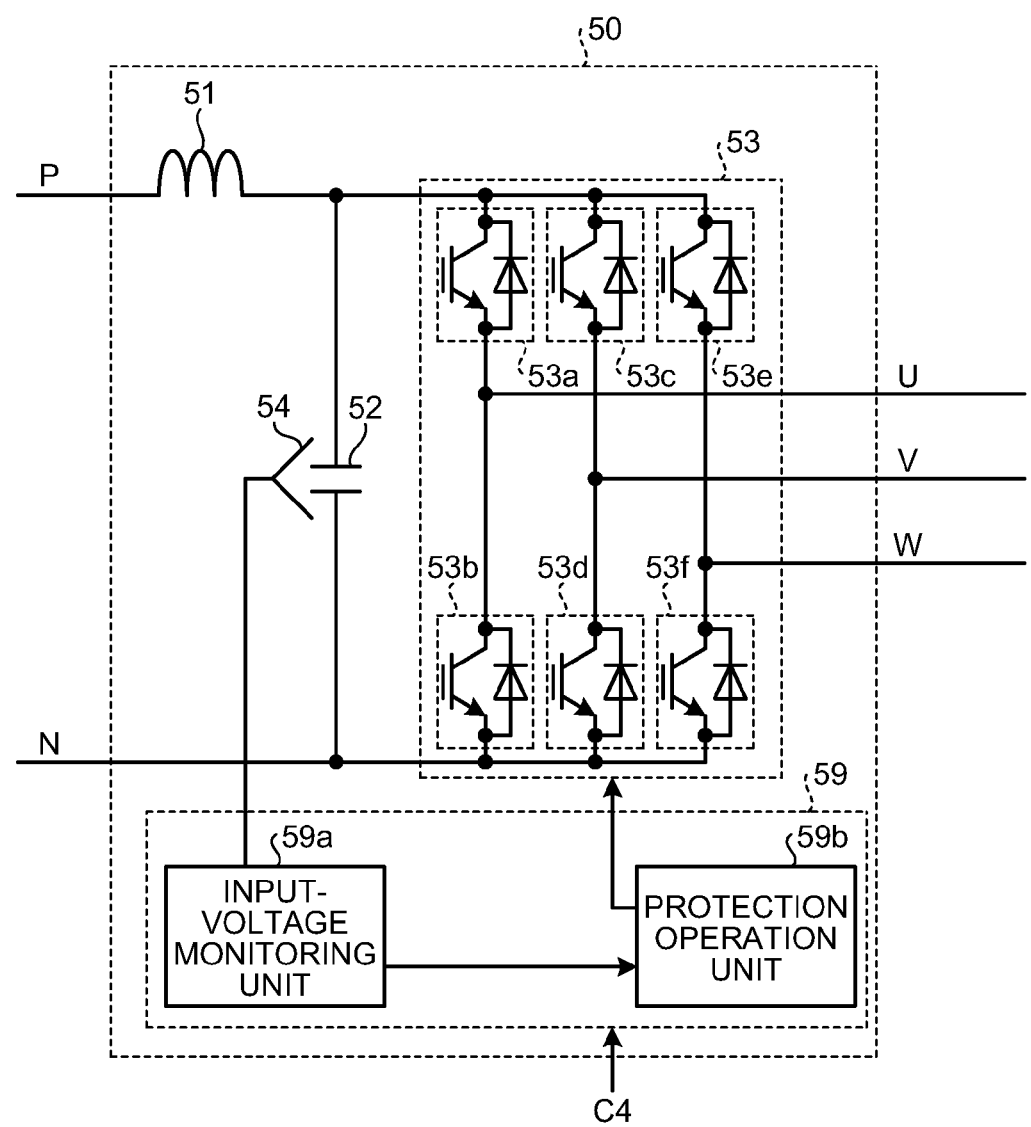
FIG. 2 is a diagram illustrating a configuration example of an inverter according to the present embodiment.

FIG. 2 is a diagram illustrating a configuration example of the inverter according to the present embodiment. The inverter 50 shown in FIG. 2 is configured to include an input filter including a reactor 51 and a filter capacitor 52, an inverter circuit 53 formed by a bridge circuit including semiconductor switching elements 53*a* to 53*f*, and the inverter control unit 59 including an input-voltage monitoring unit 59*a* and a protection operation unit 59*b*.

The inverter 50 receives a DC power output from the circuit selector switch 70 (see FIG. 1) via the input filter and converts the DC power into an AC power by the inverter circuit 53. The converted AC power is output from the terminals U-V-W. The electric motor 71 is connected to the terminals U-V-W of the inverter 50.

FIG. 2 illustrates a typical three-phase two-level PWM inverter circuit as the inverter circuit 53, and the operation thereof is a known technology, so that details thereof are omitted. Incidentally, the inverter circuit 53 is not limited to the three-phase two-level PWM inverter circuit, and, for example, the number of phases can be other than three phases and a three-level inverter circuit can be used.

A cooling method of the semiconductor switching elements 53*a* to 53*f* mounted on a cooling plate is as follows. For example, a cooling fin arranged at one end of a heat transport unit such as a heat pipe inserted into the cooling plate receives a relative wind of the electric vehicle. Heat generated from the semiconductor switching elements 53*a* to 53*f* is radiated from the cooling fin via the cooling plate and the heat transport unit. Consequently, the semiconductor switching elements 53*a* to 53*f* are cooled.

Figure 3:
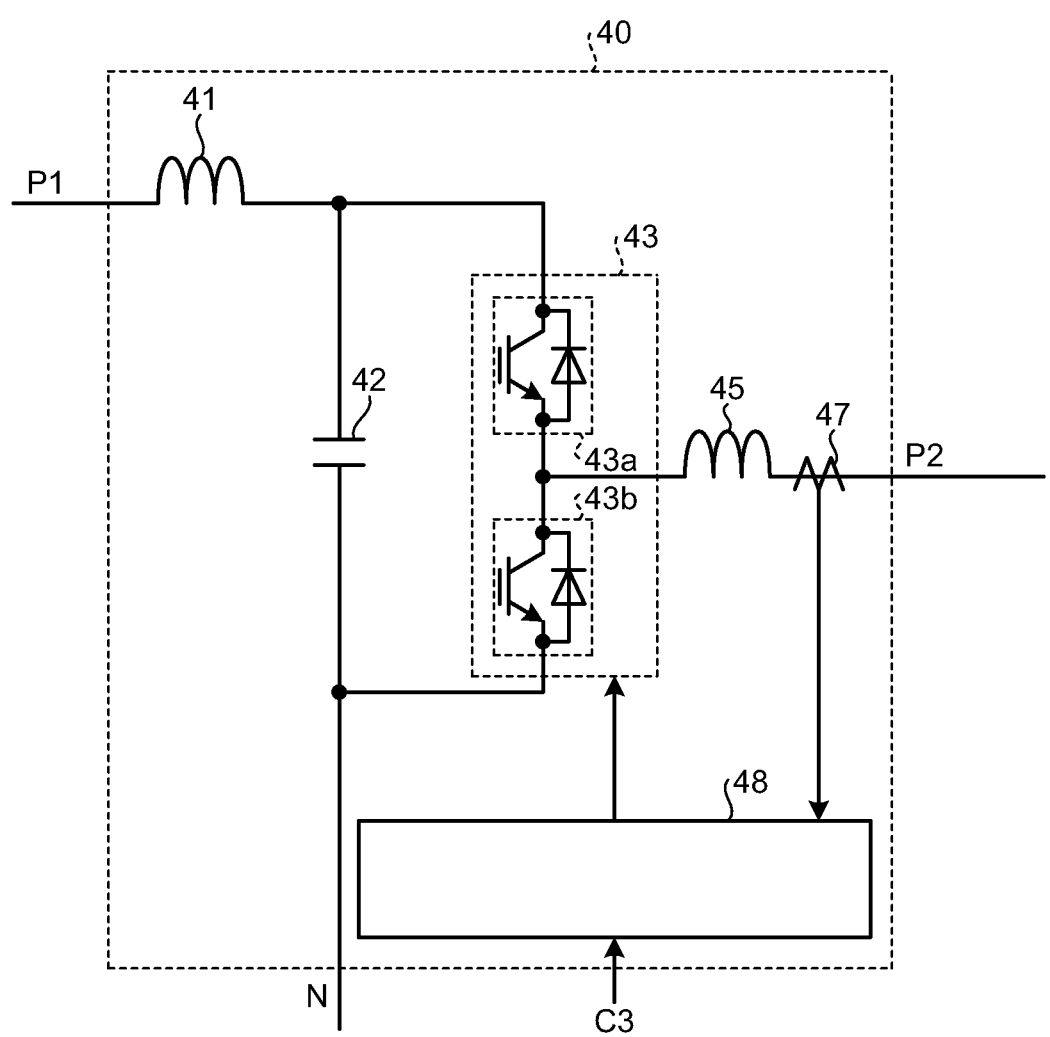
FIG. 3 is a diagram illustrating a configuration example of a DCDC converter according to the present embodiment.

FIG. 3 is a diagram illustrating a configuration example of the DCDC converter according to the present embodiment. The DCDC converter 40 shown in FIG. 3 is configured to include an input filter including a reactor 41 and a filter capacitor 42, a switching circuit 43 formed by an arm circuit including a semiconductor switching element 43*a* and a semiconductor switching element 43*b*, a reactor 45, a current detector 47, and the DCDC converter control unit 48.

The DCDC converter 40 has a current control mode of causing the current of the reactor 45 detected by the current detector 47 to match a predetermined command value and a voltage control mode of causing the voltage of the filter capacitor 42 to match a predetermined command value, and is capable of switching between these modes by the above described control signal C3. Therefore, the DC power supplied via the input filter is converted into a voltage-variable DC power by the switching circuit 43 and the reactor 45 and is output from terminals P2-N.

Moreover, the DCDC converter 40 has a conversion capacity necessary for charging the power storage element 60. The conversion capacity of the DCDC converter 40 is determined based on a time required for the power storage element 60 in a state in which stored power has been used up is fully charged. For example, it is needed to complete charging in a few hours in view of an operation of the electric vehicle. If it is designed to be fully charged in 2 hours, the conversion capacity of the DCDC converter 40 is obtained by dividing the stored electric energy of the power storage element 60 by the charging time, i.e., 100 kWh/2 hours=50 kW.

Moreover, in the emergency condition, the DCDC converter 40 boosts the power supplied from the power storage element 60 to a value near the rated (nominal) voltage of the overhead line 1 or a value within the normal voltage variation range of the overhead line 1 and supplies it to the auxiliary power device 20. The capacity of the load 31 connected to the auxiliary power device 20 is determined to be about 50 kW assuming only important loads necessary for travelling. In other words, the capacity is about the same as the above described conversion capacity.

FIG. 3 illustrates a typical bidirectional step-down chopper circuit as the DCDC converter circuit, and the operation thereof is a known technology, so that detailed explanation is omitted. Incidentally, for the DCDC converter circuit, a plurality of circuit configurations is known other than this, and the configuration thereof is arbitrary so long as the similar function can be realized.

Figure 4:
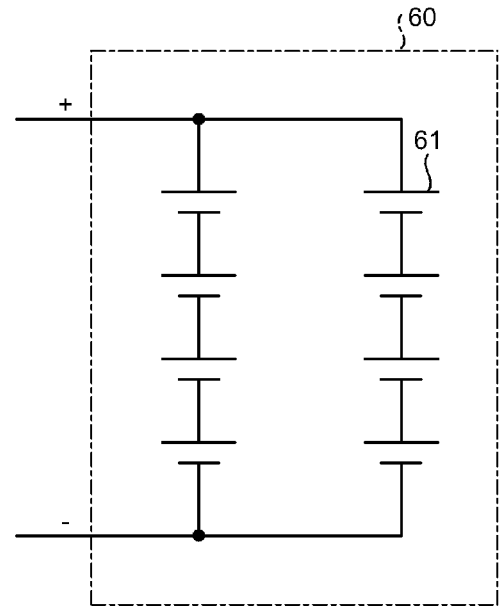
FIG. 4 is a diagram illustrating a configuration example of a power storage element according to the present embodiment.

FIG. 4 is a diagram illustrating a configuration example of the power storage element according to the present embodiment. The power storage element 60 is formed by a power storage element such as a nickel-metal-hydride secondary battery, a lithium-ion secondary battery, and an electric double layer capacitor, and the type thereof is arbitrary. Moreover, the power storage element 60 is formed by series-parallel connecting a plurality of power storage cells 61, and can adjust a voltage between output terminals +/− by adjusting the number of the power storage cells 61 connected in series. Furthermore, the stored electric energy can be adjusted by adjusting the number of the power storage cells 61 connected in parallel. The type of the power storage cell 61 can be other than the above.

The power storage element 60 is designed by assuming to move an electric vehicle, which is a 10-car commuter train for example, about a few km to a nearest station in the emergency condition, and has the stored electric energy of about 100 kWh. Moreover, the voltage between the +/− terminals of the power storage element 60 is adjusted so that the inverter 50 can operate in a one-pulse mode at an operating speed, which is close to the travelling speed in the emergency condition, by adjusting the number of the power storage cells 61 connected in series.

Specifically, although it depends on the stored power capacity of the power storage element 60, when the rated (nominal) voltage of the overhead line 1 is 1500 V, the voltage between the +/− terminals of the power storage element 60 is set to 300 V to 750 V. When the rated (nominal) voltage of the overhead line 1 is 600 V, the voltage between the +/− terminals of the power storage element 60 is set to 120 V to 300 V. In other words, the voltage between the +/− terminals of the power storage element 60 is preferably set in the range of 20% to 50% of the rated (nominal) voltage of the overhead line 1. The relationship between the voltage between the +/− terminals of the power storage element 60, the vehicle speed, and the pulse mode is described later.

In the circuit selector switch 70, A side is connected to the power collecting device 2 side, B side is connected to the power storage element 60 side, and a common terminal C is connected to a P terminal of the inverter 50. A supply source of power can be switched by switching a connection point in the circuit selector switch 70, so that the inverter 50 can drive the electric motor 71 in a mode of operating by the power supplied from the power collecting device 2 or a mode of operating by the power supplied from the power storage element 60. The electric motor 71 is an AC electric motor such as a three-phase induction motor and a permanent-magnet synchronous motor, and the electric vehicle is caused to travel by driving a wheel 3 by the electric motor 71.

Figure 5:
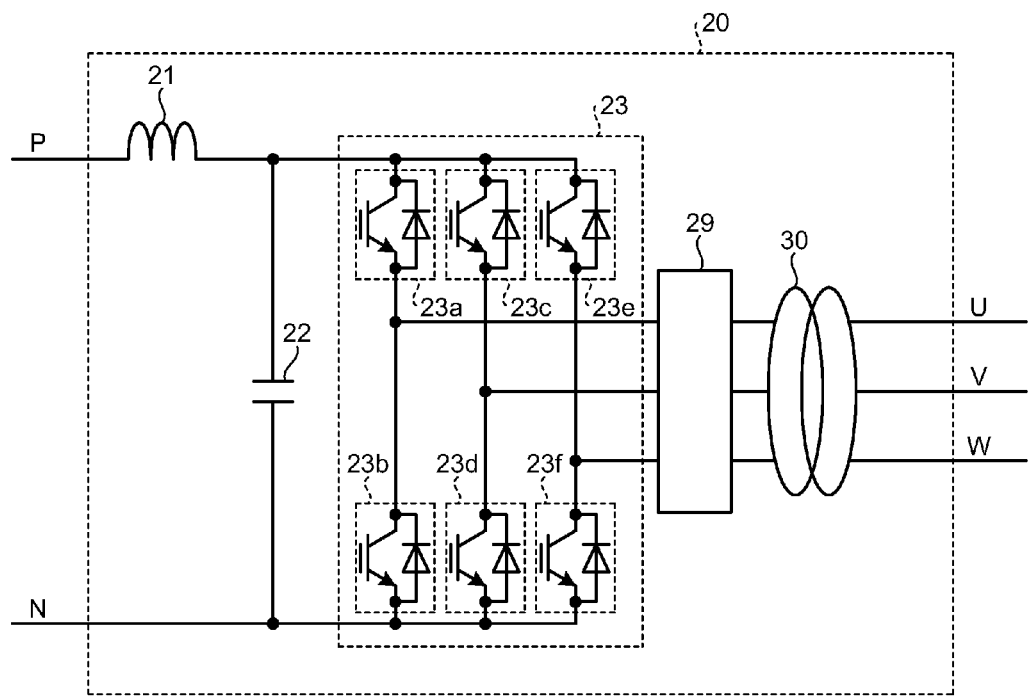
FIG. 5 is a diagram illustrating a configuration example of an auxiliary power device according to the present embodiment.

FIG. 5 is a diagram illustrating a configuration example of the auxiliary power device according to the present embodiment. The auxiliary power device 20 shown in FIG. 5 is configured to include an input filter including a reactor 21 and a filter capacitor 22, and an inverter circuit 23 formed by a bridge circuit including semiconductor switching elements 23a to 23f. Moreover, the auxiliary power device 20 includes an AC filter 29 and a transformer 30.

The auxiliary power device 20 receives a DC power output from the power collecting device 2 or from the DCDC converter 40 via the input filter and converts the DC power into an AC power by the inverter circuit 23. The converted AC power, after a switching ripple is removed by the AC filter 29, is insulated by the transformer 30, is adjusted to a predetermined voltage (typically, about AC 400 V), and is output to the load 31 from the terminals U-V-W.

FIG. 5 illustrates a typical three-phase two-level PWM inverter circuit as the inverter circuit 23, and the operation thereof is a known technology, so that details thereof are omitted. Incidentally, the inverter circuit 23 is not limited to the three-phase two-level PWM inverter circuit, and, for example, the number of phases can be other than three phases and a three-level inverter circuit can be used.

Next, the operation of the auxiliary power device 20 is explained with specific numerical values.

For example, in the case of the overhead line of which rated (nominal) voltage is 1500 V, the voltage of the overhead line 1 varies in the range of about 1000 V to 1800 V, so that the voltage between the input terminals P-N of the auxiliary power device 20 also varies similarly. This variation amount of the voltage is absorbed in the inverter circuit 23 that includes the semiconductor switching elements 23a to 23f. Specifically, when the input voltage of the auxiliary power device 20 is 1000 V that is a minimum value, the auxiliary power device 20 increases the modulation factor of the inverter circuit 23 to a value near a maximum value, and when the input voltage is 1800 V that is a maximum value, the auxiliary power device 20 reduces the modulation factor of the inverter circuit 23, thereby performing control of maintaining the input-side (primary-side) voltage of the transformer 30 to be constant. The input side (primary side) voltage of the transformer 30 is about 600 V and the output side (secondary side) voltage is about 400 V.

When the input voltage drops to less than 1000 V, the modulation factor of the inverter circuit 23 becomes a maximum value and cannot be increased over that value, so that the output voltage of the inverter circuit 23 drops in proportion to the drop of the input voltage. In other words, the input side (primary side) voltage of the transformer 30 cannot be maintained to a specified value (about 600 V in the above example) and the output voltage to the load 31 also cannot be maintained to a specified value (about 400 V in the above example). Consequently, a not-shown protection function is activated and the auxiliary power device 20 stops.

Even when the input voltage drops to less than 1000 V, in order to maintain the output voltage to the load 31 to the specified value (about 400 V in the above example), it is needed to set the input side (primary side) voltage of the transformer 30 to a low voltage, for example, 500 V, to have a margin from the upper limit in the modulation factor of the inverter circuit 23. However, if the input side (primary side) voltage of the transformer 30 is set low, a current value becomes large for obtaining the same power, so that volume, weight, and cost of the semiconductor switching elements 23a to 23f and the transformer 30 increase. In the configuration of the present embodiment, stoppage of the auxiliary power device 20 can be avoided without considering such special design.

An N terminal of the auxiliary power device 20, an N terminal of the DCDC converter 40, one terminal of the power storage element 60, and an N terminal of the inverter 50 are each connected to the wheel 3, so that a return current output from each terminal is returned to a substation (not shown) via a rail 4.

Among the above respective components, a plurality of arbitrary components can be regarded as the propulsion control apparatus for the electric vehicle. Alternatively, each of the components can be regarded as the propulsion control apparatus for the electric vehicle.

In FIG. 1, each component of the auxiliary power device 20, the DCDC converter 40, the power storage element 60, the inverter 50, the electric motor 71, and the like is illustrated as one device; however, each of them can be divided into a plurality of units.

Next, a rated capacity of each device is explained with a typical commuter train having about 10 cars as a model. Even if the number of cars is changed, the relative relationship between capacities of respective components is substantially maintained.

As the rated (nominal) voltage of the overhead line 1, DC 600 V, DC 750 V, DC 1500 V, DC 3000 V, and the like are mainly present. As described above, the load capacity is about 400 kW in total. Therefore, the conversion capacity of the auxiliary power device 20 is about 400 kW. As described above, the sum of the important loads is about 50 kW.

The electric motor 71 is about 150 kW per unit, and four electric motors 71 are provided in one electrically-operated car. In the case of a 10-car train, about four electrically-operated cars are present, so that the number of the electric motors 71 mounted on the train is 16. Thus, the sum of the outputs of the electric motors 71 is about 2400 kW.

The power-collecting-state detecting unit 11 detects the connection state of the overhead line 1 and the power collecting device 2 or the state of the power collecting device 2. The detected state is input to the linkage control unit 200. The linkage control unit 200 starts the operation of starting the DCDC converter 40, boosting the voltage from the power storage element 60, and feeding power to the auxiliary power device 20 after checking that the power collecting device 2 is surely separated from the overhead line 1. With this operation, the voltage boosted in the DCDC converter 40 can be prevented from flowing into the overhead line 1 via the power collecting device 2, so that when there is a failure point such as a short-circuit in the overhead line 1, it is prevented that the voltage boosted in the DCDC converter 40 is applied to the failure point and the damage spreads.

The open/close switch 10 is disposed between the connection portions, to which the auxiliary power device 20 and the DCDC converter 40 are connected, and the power collecting device 2, and can separate the auxiliary power device 20 and the DCDC converter 40 from the power collecting device 2. The state of the open/close switch 10 is input to the linkage control unit 200. Under the condition that the open/close switch 10 is opened, the linkage control unit 200 starts the operation of starting the DCDC converter 40, boosting the voltage from the power storage element 60, and feeding power to the auxiliary power device 20. With this operation, the voltage boosted in the DCDC converter 40 can be prevented from flowing into the overhead line 1 via the power collecting device 2, so that when there is a failure point such as a short-circuit in the overhead line 1, it is prevented that the voltage boosted in the DCDC converter 40 is applied to the failure point and the damage spreads.

Generally a configuration is adopted in which four electric motors 71 are connected to each inverter 50 in parallel and each inverter 50 drives the four electric motors 71 collectively. Therefore, the conversion capacity of each inverter 50 is about 600 kW. Four inverters 50 are mounted on the electric vehicle having 10 cars.

As described above, the power storage element 60 has an electric energy of about 100 kWh by assuming to move the electric vehicle about a few km to a nearest station in the emergency condition. As described above, the conversion capacity of the DCDC converter 40 is 50 kW (100 kWh/2 hours).

In this manner, the output capacity of the DCDC converter 40 may be a capacity capable of supplying power to the important loads connected to the auxiliary power device 20 and may be smaller than the output capacity of the auxiliary power device 20. In the propulsion control apparatus for the electric vehicle illustrated in the present embodiment, the DCDC converter 40 can be configured as a small-capacity device, so that size and weight reduction and cost reduction of the propulsion control apparatus are possible.

Next, the operation of the propulsion control apparatus for the electric vehicle is explained. The operation in the normal condition is as follows. The circuit selector switch 70 selects the A side. The auxiliary power device 20 supplies power to the load 31 by the power supplied from the overhead line 1.

Meanwhile, the inverter 50 drives the electric motor 71 by the power supplied from the overhead line 1. As described above, the power supplied to the electric motor 71 is about 2400 kW in total. The DCDC converter 40 charges the power storage element 60 by the power supplied from the overhead line 1.

The operation in the emergency condition is as follows. The circuit selector switch 70 selects the B side. The DCDC converter 40 boosts the voltage from the power storage element 60 to a value near the rated (nominal) voltage of the overhead line 1 or within the normal voltage variation range of the overhead line 1 and supplies it to the auxiliary power device 20. The auxiliary power device 20 drives the load 31 by the power supplied from the DCDC converter 40. The power supplied to the load 31 is about 50 kW with which the important loads can be driven.

Meanwhile, the inverter 50 drives the electric motor 71 by the power supplied from the power storage element 60 without via the DCDC converter 40. The power that can be supplied to the electric motor 71 is typically about five times (500 kW) of a Wh capacity (100 kWh) of the power storage element 60 although it depends on the characteristics (power density) of the power storage element 60. Therefore, the power that can be supplied to the electric motor 71 is about 20% of the normal condition (2400 kW). In this case, the vehicle speed of the electric vehicle becomes low, and the acceleration and the maximum speed both show values lower than the normal condition; however, the electric vehicle can travel by the power supplied to the load 31 and the electric motor 71.

Next, the operation of the linkage control unit 200 is explained.

When the control signal HC to be input from outside is off, the electric vehicle determines that the electric vehicle can travel by receiving power from the overhead line 1 (normal condition), turns the open/close switch 10 on by the control signals C1 to C3, connects the circuit selector switch 70 to the A side, and operates the DCDC converter 40 in the current control mode of causing the current of the reactor 45 to match a predetermined command value. Moreover, setting of the protection setting value related to the input voltage in the inverter 50 is performed based on the control signal C4.

The inverter 50 includes the input-voltage monitoring unit 59a that monitors the input voltage (voltage of the filter capacitor 52) by using a voltage detecting unit 54. Moreover, the inverter 50 includes the protection operation unit 59b that stops the inverter 50 when the input voltage falls outside a specified range. When the electric vehicle travels by receiving power from the overhead line 1, the input-voltage monitoring unit 59*a* sets the specified range to about 1000 V to 1900 V in the case where the nominal voltage of the overhead line 1 is 1500 V.

With this configuration, the power from the overhead line 1 can be directly input to the inverter 50 and the auxiliary power device 20. Moreover, with the DCDC converter 40, the power storage element 60 can be charged to a predetermined value. Furthermore, when the voltage from the overhead line 1 is within the specified value, the inverter 50 can operate stably, and when the voltage from the overhead line 1 is out of the specified value, the inverter 50 can be stopped immediately.

When the control signal HC input from outside is on, the electric vehicle determines that the electric vehicle cannot travel by receiving power from the overhead line 1 (emergency condition), turns the open/close switch 10 off by the control signals C1 to C3, connects the circuit selector switch 70 to the B side, and operates the DCDC converter 40 in the voltage control mode of causing the voltage of the filter capacitor 42 to match a predetermined command value. The operation of the DCDC converter 40 is started under the condition that the open/close switch 10 is turned off. Moreover, setting change of the protection setting value related to the input voltage in the inverter 50 is performed based on the control signal C4.

As described above, the inverter 50 includes the input-voltage monitoring unit 59*a*, and when the electric vehicle travels by receiving power from the power storage element 60, the input-voltage monitoring unit 59*a* sets the specified range to about 400 V to 700 V in the case where the nominal voltage of the power storage element 60 is 600 V.

With this configuration, when the voltage of the power storage element 60 is within the specified value, the inverter 50 can operate stably, and when the voltage of the power storage element 60 is out of the specified value, the inverter 50 can be stopped immediately. Moreover, the power from the power storage element 60 can be directly input to the inverter 50. Therefore, the stored power of the power storage element 60 can be supplied to the electric motor 71 via the inverter 50 without loss. Moreover, the power from the power storage element 60 can be boosted to the predetermined value and supplied to the auxiliary power device 20 by the DCDC converter 40.

The configuration can be such that the protection setting values related to the input voltage set to the protection operation unit 59*b* and the input-voltage monitoring unit 59*a* are set independently in the inverter 50 and the protection setting value is not necessarily set based on the control signal C4. For example, the configuration can be such that the protection setting value is determined and set based on the average value of the input value.

The linkage control unit 200 is configured to output a control command to an air conditioner (not shown), which is in the power feeding range of the auxiliary power device 20 and mounted on the electric vehicle, and is preferably configured to, when the electric vehicle travels by the power from the power storage element 60, stops the air conditioner by outputting a stop command to the air conditioner. With this configuration, power consumption in the air conditioner can be reduced, so that the power from the power storage element 60 can be used maximally for traveling.

The linkage control unit 200 is configured to output a control command to an air conditioner (not shown), which is in the power feeding range of the auxiliary power device 20 and mounted on the electric vehicle, and is preferably configured to, when the electric vehicle travels by the power from the power storage element 60, output a stop command for a refrigerant pressing compressor (not shown) in the air conditioner and to cause a separately provided blast fan (not shown) to continuously operate for the inside of the electric vehicle. With this configuration, blast to the inside of the electric vehicle can be maintained while reducing power consumption in the refrigerant pressing compressor that accounts for a majority of the power consumption in the air conditioner, so that the power from the power storage element 60 can be used maximally for traveling without significantly impairing the in-vehicle environment.

In this manner, the linkage control unit 200 has a function of controlling the open/close switch 10, the circuit selector switch 70, the DCDC converter 40, and the inverter 50 mounted on the propulsion control apparatus for the electric vehicle in a linked manner by outputting the control signals C1, C2, C3, and C4 to these devices. Therefore, the linkage control unit 200 is a core for providing an optimum operation in the normal condition or in the emergency condition to the system of the propulsion control apparatus for the electric vehicle according to the present embodiment.

In the emergency condition, the voltage of the filter capacitor 42 that is boosted and controlled by the DCDC converter 40 is preferably set to a value near the lower limit (for example, about 1200 V in the case where the rated (nominal) voltage of the overhead line 1 is 1500 V) of the normal variation range of the overhead line 1. This voltage is approximately equal to the lower limit of the allowable input voltage of the auxiliary power device 20. With this setting, the boost ratio of the DCDC converter 40 is made small, so that noise from the reactor 45 can be reduced.

The DCDC converter 40 has therein a target value of electric energy to be stored in the power storage element 60, and has a function of performing a charge/discharge operation so that the actual stored electric energy of the power storage element 60 matches this target value of the stored electric energy. The ratio of the current stored electric energy to the maximum storable electric energy of the power storage element 60 is called a SOC (State Of Charge). During the time when the electric vehicle is travelling, for the target value of the stored electric energy, the SOC is set to a maximum, i.e., approximately 100%. This is because if the electric vehicle becomes unable to travel by receiving power from the overhead line 1 during operation, the travelling distance can be ensured to the maximum by maximally utilizing the performance of the power storage element 60. On the other hand, after the electric vehicle finishes the operation, the SOC is reduced to, for example, 80% or less that is a value lower than that during operation and is maintained. This is because if the SOC of the power storage element 60 is maintained at a value near 100% for a long time, degradation of the inside of the power storage element 60 proceeds, which is avoided by the above setting. In this manner, the power storage element 60 can be used for a long time by extending the life thereof through the setting of the SOC as low as possible. For the target value of the stored electric energy, the configuration is considered in which the SOC is set to become close to 100% under the condition that the electric vehicle is started and is reduced in a predetermined time at nighttime by time information included in the DCDC converter 40.

Moreover, the configuration can be such that the target value of the stored electric energy is input to the DCDC converter 40 as a control signal from the external linkage control unit 200. With this configuration, for example, when a plurality of the DCDC converters 40 and the power storage elements 60 are present in the cars of the electric vehicle, the operation thereof can be collectively controlled.

Furthermore, when the electric vehicle is expected not to be used for a long time, the target value of the stored electric energy is preferably lowered. Specifically, the configuration is preferably such that the target value of the stored electric energy is set in such a manner that the operation state (powering, state of a brake, state of current, and the like) of the inverter 50 is monitored, and when the inverter 50 does not operate for a certain period of time, it is determined that the electric vehicle is parked in a train shed and the SOC is reduced. It is needless to say that the configuration can be such that the target value of the stored electric energy is set from outside such as an operation command center that collectively manages information on a train operation.

Next, merits of the propulsion control apparatus for the electric vehicle according to the present embodiment are explained below.

Figure 6:
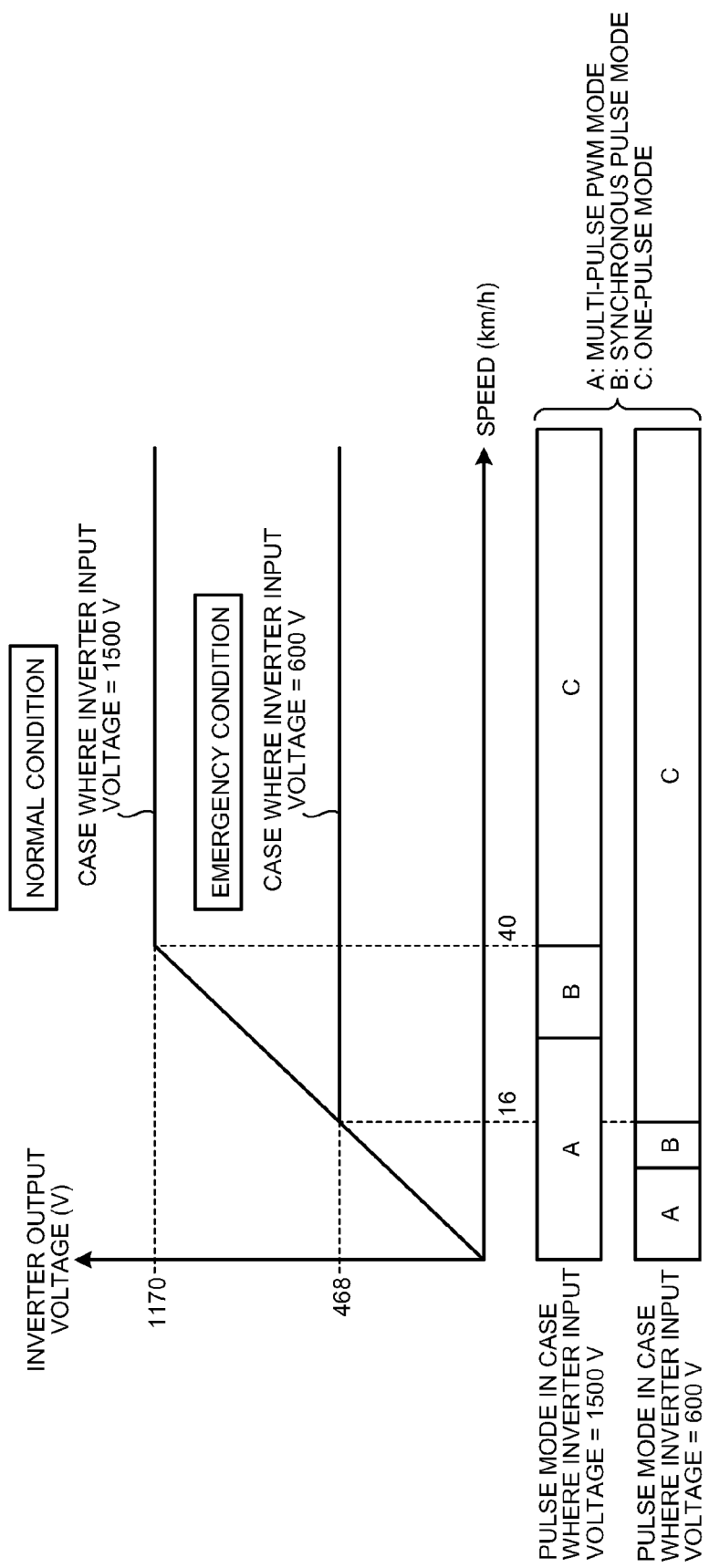
FIG. 6 is a diagram illustrating an example of a relationship between an inverter output voltage, a vehicle speed, and a pulse mode according to the present embodiment.

First, a special design consideration for the inverter 50 is not needed. FIG. 6 is a diagram illustrating an example of the relationship between the inverter output voltage, the vehicle speed, and the pulse mode according to the present embodiment. A vertical axis of a graph illustrated on the upper side of FIG. 6 indicates the output voltage of the inverter 50 and a horizontal axis indicates the vehicle speed of the electric vehicle. In the graph, as an example, an output voltage—speed characteristic when the rated (nominal) voltage (1500 V) of the overhead line 1 is applied to the inverter 50 and an output voltage—speed characteristic when the terminal voltage (600 V) of the power storage element 60 is applied to the inverter 50 are illustrated.

In the lower portion of FIG. 6, a state of change in the pulse mode when the rated (nominal) voltage (1500 V) of the overhead line 1 is applied to the inverter 50 is illustrated. Moreover, a state of change in the pulse mode when the terminal voltage (600 V) of the power storage element 60 is applied to the inverter 50 is illustrated.

In the normal condition, when the inverter 50 is driven by the power supplied from the power collecting device 2, the output voltage of the inverter 50 linearly increases from 0 V to 1170 V (=1500 V×√6/π; known equation). The inverter 50 operates in a multi-pulse PWM mode indicated by sign A and a synchronous pulse mode indicated by sign B.

The output voltage of the inverter 50 reaches the maximum value of 1170 V at a speed near 40 km/h, and the inverter 50 operates in the one-pulse mode indicated by sign C. The operating speed of the electric vehicle in the normal condition is 80 km/h to 100 km/h, so that the inverter 50 operates in the one-pulse mode most of the time except for the time of acceleration and deceleration.

On the other hand, in the emergency condition, when the inverter 50 is driven by the power from the power storage element 60 in which the terminal voltage is set to 600 V, the output voltage of the inverter 50 linearly increases from 0 V to 468 V (=600 V×√6/π; known equation). The inverter 50 operates in the multi-pulse PWM mode indicated by sign A and the synchronous pulse mode indicated by sign B.

The output voltage of the inverter 50 reaches the maximum value of 468 V at a speed near 16 km/h, and the inverter 50 operates in the one-pulse mode indicated by sign C. The operating speed of the electric vehicle in the emergency condition is typically around 30 km/h, so that the inverter 50 can operate in the one-pulse mode most of the time except for the time of acceleration and deceleration. In other words, the number of pulses in a half cycle of the output voltage of the inverter 50 shows one, which is a minimum, and the switching loss also becomes minimum.

If the terminal voltage of the power storage element 60 is set to 1500 V similarly to the voltage of the overhead line 1, even if the maximum speed of the electric vehicle is around 30 km/h, the inverter 50 always operates at the switching frequency (around 1000 Hz) in the pulse mode derived from the output voltage–speed characteristic corresponding to the input voltage of the inverter 50, i.e., the multi-pulse PWM mode, by the power supplied to the inverter 50 from the power storage element 60 in the emergency condition. If the inverter 50 operates in the state where the switching loss is large, with a cooling fin that is designed considering an operation in the one-pulse mode, the cooling performance is insufficient, so that a problem arises that the inverter 50 is overheated.

As a countermeasure against the above problem, it is possible to specially design an inverter with enhanced cooling performance considering a low speed operation; however, it causes increase in weight, dimension, cost, and the like of the inverter device.

In the propulsion control apparatus for the electric vehicle according to the present embodiment, in the configuration in which the circuit selector switch 70 that selects one of the power supplied from the overhead line 1 and the power supplied from the power storage element 60 and outputs it to the inverter 50 is included, and, in the normal condition, the power of the overhead line 1 is supplied to the inverter 50, and, in the emergency condition, the power from the power storage element 60 is supplied to the inverter 50, the voltage applied from the power storage element 60 to the inverter 50 is set low compared to the voltage applied from the overhead line 1 to the inverter 50, so that even when travelling at a low speed by the power supplied from the power storage element 60, the inverter 50 can be operated in the one-pulse mode. Therefore, the inverter with enhanced cooling performance does not need to be specially designed, so that increase in weigh, dimension, cost, and the like of the inverter 50 can be avoided.

When the electric vehicle travels along a rising slope or in other cases, if the speed of the electric vehicle decreases to, for example, 16 km/h or less, the inverter 50 performs switching in the multi-pulse PWM mode. In this case, as described above, the inverter 50 may be overheated due to insufficient cooling performance. To avoid this, it is more preferable to configure such that the output voltage of the inverter 50 is changed in accordance with the temperature of the semiconductor switching elements 53a to 53f forming the inverter 50 to control to enable the inverter 50 to operate in the one-pulse mode.

Specifically, when the temperature of the semiconductor switching elements 53a to 53f forming the inverter 50 rises to a predetermined value or more, the inverter 50 is controlled such that the output voltage of the inverter 50 is increased to operate the inverter 50 in the one-pulse mode at a speed lower than the above configuration.

The output voltage of the inverter 50 is preferably increased until the inverter 50 starts to perform the switching operation in the one-pulse mode.

As a method of increasing the output voltage of the inverter 50, it is effective to increase an excitation current command to the electric motor 71 in the electric motor control unit (not shown) in the inverter 50 to raise the output voltage of the inverter 50. When the output voltage of the inverter 50 is increased, the voltage higher than the normal is applied to the electric motor 71 at the same speed (frequency), and the electric motor 71 operates in a so-called overexcited state in which the excitation current of the electric motor 71 becomes larger than a rated operation. Consequently, the temperature of the electric motor 71 rises; however, the electric motor 71 has a thermal time constant larger than the inverter 50, therefore causing no problem in the case of causing the electric vehicle to travel to a nearest station.

Second, the system loss of the whole propulsion control apparatus for the electric vehicle including the inverter 50 can be minimized. With the circuit selector switch 70, the power storage element 60 can be directly connected to the inverter 50, so that a voltage conversion circuit and the like do not need to be provided between the power storage element 60 and the inverter 50. Therefore, there is no power loss due to the voltage conversion circuit and the like and the system loss of the whole propulsion control apparatus for the electric vehicle including the inverter 50 can be minimized, so that the stored electric energy of the power storage element 60 can be maximally utilized.

Third, a special design consideration for the auxiliary power device 20 is not needed. The DCDC converter 40 can boost the voltage from the power storage element 60 to a value near the rated (nominal) voltage of the overhead line 1 or within the normal voltage variation range of the overhead line 1 in the emergency condition and can cause the auxiliary power device 20 to operate in the power supply condition same as the normal condition. Therefore, the auxiliary power device 20 does not need to be designed to, for example, lower the setting of the input side (primary side) voltage of the transformer 30 in the auxiliary power device 20, and volume, weight, and cost of the semiconductor switching elements 23a to 23f and the transformer 30 do not increase.

Fourth, the DCDC converter 40 used for charging the power storage element 60 can be utilized effectively. The conversion capacity of the DCDC converter 40 is such that the capacity needed for boosting and power feeding to the auxiliary power device 20 and the capacity needed for full charging of the power storage element 60 in a predetermined period of time are approximately the same (50 kW in the above embodiment). Therefore, the DCDC converter 40 can charge the power storage element 60 in the normal condition and perform the boosting and power feeding on the auxiliary power device 20 in the emergency condition without adding a special device to the DCDC converter 40. In other words, the DCDC converter 40 provided for charging the power storage element 60 in the propulsion control apparatus for the electric vehicle can be utilized.

The propulsion control apparatus for the electric vehicle according to the present embodiment is configured to include the power-collecting-state detecting unit 11 and start the boost operation of the DCDC converter 40 after checking that the power collecting device 2 is surely separated from the overhead line 1, so that the voltage boosted in the DCDC converter 40 can be prevented from flowing into the overhead line 1 via the power collecting device 2 and thus damage spread in a short-circuited point or the like of the overhead line 1 can be avoided.

Moreover, the propulsion control apparatus for the electric vehicle according to the present embodiment is configured to include the open/close switch 10 between the connection portions, to which the auxiliary power device 20 and the DCDC converter 40 are connected, and the power collecting device 2, and start the boost operation of the DCDC converter 40 under the condition that the open/close switch 10 is opened, so that the voltage boosted in the DCDC converter 40 can be prevented from flowing into the overhead line 1 via the power collecting device 2, and thus damage spread in a short-circuited point or the like of the overhead line 1 can be avoided.

With the above configuration, it is possible to provide the propulsion control apparatus for the electric vehicle suitable for causing the electric vehicle to travel by the power supplied from the power storage element 60 in the emergency condition such as a power interruption of the overhead line while avoiding increase in weigh, dimension, and cost of the inverter 50 that controls to drive the electric motor 71 and the auxiliary power device 20 that supplies power to the load 31.

The configuration of the propulsion control apparatus for the electric vehicle illustrated in the present embodiment illustrates one example of the content of the present invention, and it is needless to say that the configuration can be combined with a different publicly known technology and can be changed, for example, by omitting a part thereof without departing from the gist of the present invention.

As explained above, according to the propulsion control apparatus for the electric vehicle in the present embodiment, the configuration is such that the circuit selector switch 70 that selects one of the power supplied from the external power supply and the power supplied from the power storage element 60 and supplies the power to the inverter 50, and the linkage control unit 200 that controls the inverter 50, the DCDC converter 40, and the circuit selector switch 70 in a linked manner, and the inverter 50, the DCDC converter 40, and the circuit selector switch 70 are controlled in a linked manner, so that a travel control of the electric vehicle utilizing the power from the power storage element 60 can be suitably performed in the emergency condition such as a power interruption of the overhead line while avoiding increase in weigh, dimension, and cost of the inverter 50 and the auxiliary power device 20.

Moreover, the configuration is such that the power storage element 60 can be directly connected to the inverter 50 by the circuit selector switch 70, a voltage conversion circuit and the like do not need to be provided between the power storage element 60 and the inverter 50, whereby the system loss of the whole propulsion control apparatus for the electric vehicle including the inverter 50 can be minimized and therefore the stored electric energy of the power storage element 60 can be maximally utilized.

Furthermore, the DCDC converter 40 is configured to be able to boost the voltage from the power storage element 60 to a value near the rated (nominal) voltage of the overhead line 1 or within the normal voltage variation range of the overhead line 1 in the emergency condition and causes the auxiliary power device 20 to operate in the power supply condition same as the normal condition, so that the auxiliary power device 20 does not need to be designed to, for example, lower the setting of the input side (primary side) voltage of the transformer 30 in the auxiliary power device 20, and volume, weight, and cost of the semiconductor switching elements 23a to 23f and the transformer 30 can be prevented from increasing.

Moreover, the conversion capacity of the DCDC converter 40 is such that the capacity needed for the boosting and power feeding to the auxiliary power device 20 and the voltage needed for full charging of the power storage element 60 in a predetermined period of time are approximately the same (50 kW in the above embodiment), so that the DCDC converter 40 can charge the power storage element 60 in the normal condition and perform the boosting and power feeding on the auxiliary power device 20 in the emergency condition without adding a special device to the DCDC converter 40.

Furthermore, the propulsion control apparatus for the electric vehicle according to the present embodiment is configured to include the power-collecting-state detecting unit 11 and start the boost operation of the DCDC converter 40 after checking that the power collecting device 2 is surely separated from the overhead line 1, so that the voltage boosted in the DCDC converter 40 can be prevented from flowing into the overhead line 1 and thus damage spread in a short-circuited point or the like of the overhead line 1 can be avoided.

Moreover, the propulsion control apparatus for the electric vehicle according to the present embodiment is configured to include the open/close switch 10 between the connection portions, to which the auxiliary power device 20 and the DCDC converter 40 are connected, and the power collecting device 2, and start the boost operation of the DCDC converter 40 under the condition that the open/close switch 10 is opened, so that the voltage boosted in the DCDC converter 40 can be prevented from flowing into the overhead line 1 and thus damage spread in a short-circuited point or the like of the overhead line 1 can be avoided.

INDUSTRIAL APPLICABILITY

As described above, the propulsion control apparatus for the electric vehicle according to the present invention is useful as a propulsion control apparatus for an electric vehicle that causes the electric vehicle to travel by power supplied from a power storage element in an emergency condition such as a power interruption of an overhead line.

The invention claimed is:

1. A propulsion control apparatus for an electric vehicle that includes an inverter that converts a direct-current voltage into an alternating-current voltage, a power storage element, and a DCDC converter connected to the power storage element, comprising:
 a circuit selector unit that selects any one of power supplied from an external power supply via a power collecting device and power supplied from the power storage element and outputs the supplied power to the inverter,
 wherein the inverter is configured to:
  operate in a plurality of pulse modes, wherein each pulse mode defines a different number of pulses included in a half cycle of an output-voltage fundamental wave of the inverter, and
  perform a predetermined operation of changing the operating pulse mode to a pulse mode that has a predetermined number of pulses or less included in the half cycle, in accordance with a speed of the electric vehicle, and
 wherein the predetermined operation of changing the operating pulse mode is performe at a lower speed when the electric vehicle travels by power from the power storage element than when the electric vehicle travels by receiving power from the external power supply.

2. The propulsion control apparatus for the electric vehicle according to claim 1, further comprising a linkage control unit that outputs, in accordance with each of the case where the electric vehicle travels by receiving power from the external power supply and the case where the electric vehicle travels by power from the power storage element, a control signal to the DCDC converter and the circuit selector unit and controls at least the DCDC converter and the circuit selector unit in a linked manner.

3. The propulsion control apparatus for the electric vehicle according to claim 1, wherein
 a voltage between terminals of the power storage element is a value that is adjusted such that the inverter is operable in a one-pulse mode at an operating speed when travelling by power from the power storage element.

4. The propulsion control apparatus for the electric vehicle according to claim 1, wherein a voltage value at terminals of the power storage element is a value that is 20 to 50% of a rated voltage of the external power supply.

5. The propulsion control apparatus for the electric vehicle according to claim 1, wherein the predetermined number is one.

6. The propulsion control apparatus for the electric vehicle according to claim 1, further comprising an auxiliary power device that supplies power to a load mounted on the electric vehicle, wherein
 the DCDC converter, when it becomes unable to receive power from the external power supply, boosts a voltage from the power storage element approximately to a voltage that the auxiliary power device normally receives from the external power supply and supplies it to the auxiliary power device.

7. The propulsion control apparatus for the electric vehicle according to claim 1, further comprising a power-collecting-state detecting unit that detects a connection state between the external power supply and the power collecting device, wherein
 the DCDC converter performs a boost operation under a condition that the power-collecting-state detecting unit detects that a connection between the external power supply and the power collecting device is disconnected.

8. The propulsion control apparatus for the electric vehicle according to claim 1, further comprising an open/close unit that is provided between connection portions, to which the auxiliary power device and the DCDC converter are connected, and the power collecting device and separates the auxiliary power device and the DCDC converter from the power collecting device, wherein
 the DCDC converter performs a boost operation under a condition that the open/close unit is opened.

9. The propulsion control apparatus for the electric vehicle according to claim 2, wherein
 the linkage control unit,
  in a case where it is determined that travelling of the electric vehicle by receiving power from the external power supply is possible, controls the circuit selector unit such that the inverter is directly connected to the external power supply and controls such that the DCDC converter performs an operation of charging the power storage element by power from the external power supply, and
  in a case where it is determined that travelling of the electric vehicle by receiving power from the external power supply is impossible, controls the circuit selector unit such that the inverter is directly connected to the power storage element and controls such that the DCDC converter performs an operation of supplying power from the power storage element to an auxiliary power device that supplies power to a load mounted on the electric vehicle.

10. The propulsion control apparatus for the electric vehicle according to claim 2, wherein
 a configuration is such that the control signal from the linkage control unit is output to an air conditioner of the electric vehicle, which is in a power feeding range of the auxiliary power device, and
 the linkage control unit, when the electric vehicle travels by power from the power storage element, stops the air conditioner by outputting a stop command to the air conditioner.

11. The propulsion control apparatus for the electric vehicle according to claim 2, wherein
 a configuration is such that the control signal from the linkage control unit is output to an air conditioner mounted on the electric vehicle, which is in a power feeding range of the auxiliary power device, and the linkage control unit, when the electric vehicle travels by power from the power storage element, outputs a stop command for a refrigerant pressing compressor in the air conditioner and causes to continue an operation of a blast fan mounted on the electric vehicle.

12. The propulsion control apparatus for the electric vehicle according to claim 1, wherein
the DCDC converter includes an input filter circuit that includes a reactor and a filter capacitor that are connected to the external power supply, and a switching circuit that converts a direct-current voltage of the filter capacitor into an arbitrary direct-current voltage and outputs it, and
the switching circuit, when it is formed by an upper-arm-side switching element and a lower-arm-side switching element that are connected to the filter capacitor in parallel and is configured such that a reactor is connected to a connection point of the upper-arm-side switching element and the lower-arm-side switching element, has a voltage control mode of controlling a filter capacitor voltage of the DCDC converter to a predetermined value and a current control mode of controlling a reactor current of the DCDC converter to a predetermined value.

13. The propulsion control apparatus for the electric vehicle according to claim 12, wherein the DCDC converter operates while switching the control mode between the case where the electric vehicle travels by receiving power from the external power supply and the case where the electric vehicle travels by power from the power storage element.

14. The propulsion control apparatus for the electric vehicle according to claim 12, wherein the DCDC converter controls a voltage of the filter capacitor to be a value near an allowable lower limit of an input voltage of the auxiliary power device.

15. The propulsion control apparatus for the electric vehicle according to claim 1, wherein the DCDC converter has a target value concerning a stored electric energy of the power storage element, controls the stored electric energy to be the target value by performing charging and discharging on the power storage element, and changes the target value of the stored electric energy at least in accordance with time.

16. The propulsion control apparatus for the electric vehicle according to claim 2, wherein the DCDC converter has a target value concerning a stored electric energy of the power storage element, controls the stored electric energy to be the target value by performing charging and discharging on the power storage element, and changes the target value of the stored electric energy in accordance with the control signal from the linkage control unit.

17. The propulsion control apparatus for the electric vehicle according to claim 1, wherein the DCDC converter has a target value concerning a stored electric energy of the power storage element, controls the stored electric energy to be the target value by performing charging and discharging on the power storage element, and lowers the target value of the stored electric energy in accordance with an operation state of the inverter.

18. The propulsion control apparatus for the electric vehicle according to claim 6, wherein an output capacity of the DCDC converter is equal to or less than an output capacity of the auxiliary power device.

19. The propulsion control apparatus for the electric vehicle according to claim 2, wherein
the inverter at least includes an input-voltage monitoring unit that monitors an input voltage of the inverter and a protection operation unit that, when the input voltage falls outside a predetermined range, stops the inverter, and
the input-voltage monitoring unit switches the predetermined range for the input voltage between the case where the electric vehicle travels by receiving power from the external power supply and the case where the electric vehicle travels by power from the power storage element.

20. The propulsion control apparatus for the electric vehicle according to claim 1, wherein the inverter performs a predetermined operation of changing an output voltage of the inverter in accordance with a temperature of a semiconductor switching element included in the inverter.

21. The propulsion control apparatus for the electric vehicle according to claim 20, wherein the inverter, when the temperature of the semiconductor switching element included in the inverter is a predetermined value or more, performs a predetermined operation of increasing the output voltage of the inverter.

22. The propulsion control apparatus for the electric vehicle according to claim 21, wherein the inverter, when the temperature of the semiconductor switching element included in the inverter is the predetermined value or more, performs a predetermined operation of increasing the output voltage of the inverter until starting a switching operation in a one-pulse mode.

23. The propulsion control apparatus for the electric vehicle according to claim 20, wherein the predetermined operation is to increase an excitation current of an electric motor that is a load of the inverter.

24. The propulsion control apparatus for the electric vehicle according to claim 12, wherein the DCDC converter switches between the voltage control mode and the current control mode in accordance with the control signal from the linkage control unit.

25. The propulsion control apparatus for the electric vehicle according to claim 19, wherein the inverter switches the predetermined range for the input voltage in accordance with the control signal from the linkage control unit.

26. The propulsion control apparatus for the electric vehicle according to claim 1, wherein the DCDC converter has a target value concerning a stored electric energy of the power storage element, controls the stored electric energy to be the target value by performing charging and discharging on the power storage element, and changes the target value of the stored electric energy in accordance with an external control signal.

* * * * *